US009183888B2

(12) United States Patent
Watanabe et al.

(10) Patent No.: US 9,183,888 B2
(45) Date of Patent: Nov. 10, 2015

(54) INFORMATION PROCESSING DEVICE INFORMATION PROCESSING METHOD AND PROGRAM STORAGE MEDIUM

(75) Inventors: Kazuhiro Watanabe, Tokyo (JP); Wataru Kaku, Yokohama (JP); Daijirou Nagasaki, Kamakura (JP); Nobuo Oshimoto, Kawasaki (JP); Susumu Oya, Kamakura (JP); Yusuke Hokari, Tokyo (JP); Eri Kanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 540 days.

(21) Appl. No.: 13/543,578

(22) Filed: Jul. 6, 2012

(65) Prior Publication Data

US 2013/0016954 A1  Jan. 17, 2013

(30) Foreign Application Priority Data

Jul. 11, 2011  (JP) .................. 2011-152840

(51) Int. Cl.
*H04N 5/93* (2006.01)
*G11B 27/34* (2006.01)
*G11B 27/031* (2006.01)
*G11B 27/10* (2006.01)

(52) U.S. Cl.
CPC .............. *G11B 27/34* (2013.01); *G11B 27/031* (2013.01); *G11B 27/105* (2013.01)

(58) Field of Classification Search
CPC ....................................... H04N 5/93

USPC ......................................................... 386/230
See application file for complete search history.

(56) References Cited

U.S. PATENT DOCUMENTS

2008/0159708 A1*  7/2008  Kazama et al. ................. 386/69
2011/0164029 A1*  7/2011  King et al. ..................... 345/419

FOREIGN PATENT DOCUMENTS

| JP | H05-268517 A | 10/1993 |
| JP | H06-110943 A | 4/1994 |
| JP | 10-191248 A | 7/1998 |
| JP | 2005-301693 A | 10/2005 |

OTHER PUBLICATIONS

Chisan et al., "Video Bench Final Report", University of Victoria, Apr. 11, 2003, pp. 1-47.

* cited by examiner

*Primary Examiner* — Thai Tran
*Assistant Examiner* — Nien-Ru Yang
(74) *Attorney, Agent, or Firm* — Canon U.S.A., Inc. IP Division (57) ABSTRACT

An object three-dimensionally represented by frames contained in a moving image and a time axis indicative of a playback time of the moving image is displayed on a display unit, and, while the three dimensional image being displayed, and an object representative of a moving image of a part between two points detected on the time axis is displayed in response to an instruction by a thing approaching to the display unit and is moved in accordance with a moving operation on the thing.

9 Claims, 9 Drawing Sheets

FIG. 7A

INFORMATION PROCESSING DEVICE INFORMATION PROCESSING METHOD AND PROGRAM STORAGE MEDIUM

BACKGROUND OF THE INVENTION

1. Field of the Invention

The present invention relates to apparatuses which edit a file representative of moving images, for example, and methods therefor.

2. Description of the Related Art

In the past, it has been known that a moving image is edited by displaying still images contained in a moving image along a time axis and designating a point called an "edit point" or a "separation point". For example, in order to extract a part of a moving image, a user may designate a point as a starting point or an end point.

According to Japanese Patent Laid-Open No. 10-191248, in order to visually understand the time lengths of a plurality of part moving images, a moving image is displayed three-dimensionally so that the time length of the moving image may correspond to a depth of the solid.

However, according to Japanese Patent Laid-Open No. 10-191248, an edit point is to be instructed or input with a pointing device such as a mouse to a waveform of an audio signal of a video shown on a display, which makes implementation of simple and intuitive editing by a user difficult.

SUMMARY OF THE INVENTION

It is an object of the present invention to allow visual understanding of the time length of a moving image and allow more intuitive operations in moving image editing works.

Further features of the present invention will become apparent from the following description of exemplary embodiments with reference to the attached drawings.

DESCRIPTION OF THE PREFERRED EMBODIMENTS

Figure 1A:
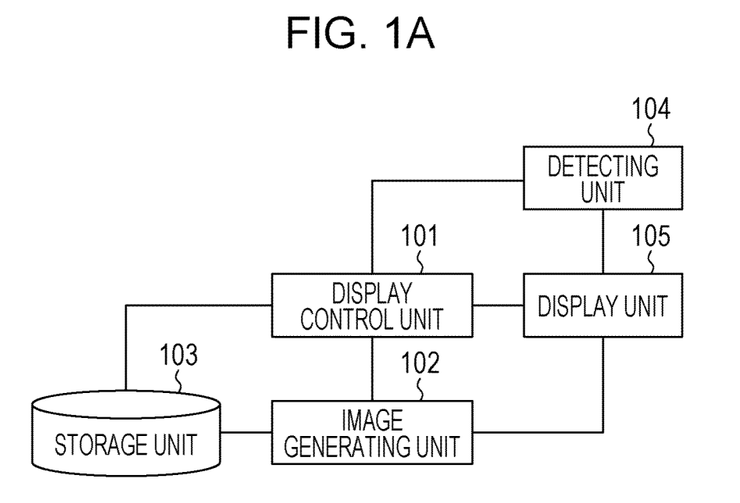
FIG. 1A, FIG. 1B, and FIG. 1C are block diagram showing a configuration of an apparatus.

A first embodiment of the present invention will be described. FIG. 1A is a block diagram illustrating a functional configuration of an information processing device according to a first embodiment. A display control unit 101 controls display data on a display unit 105 on the basis of information detected by a detecting unit 104, a moving image (hereinafter, called a video file) read from the storage unit 103, and an image generated by an image generating unit 102. On an initial screen, a still image corresponding to a frame at a starting point of a video file (hereinafter, called a thumbnail image) is displayed. The image generating unit 102 generates an image for displaying a video file as an object represented three-dimensionally with a thumbnail image and a time axis (hereinafter, called a three-dimensional object). The detecting unit 104 is integrated with the display unit 105 and may detect that a user has performed an instruction/input operation on displayed data. The detecting unit 104 may further detect position information on the display unit 105 which is input by a user.

Figure 1B:
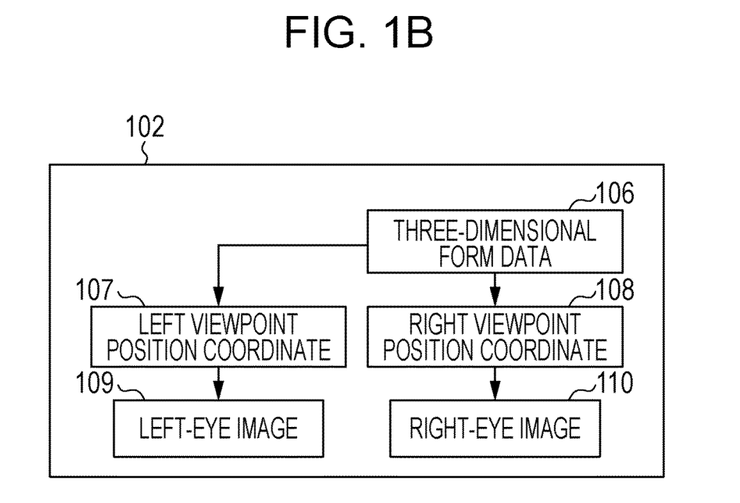
Figure 1C:
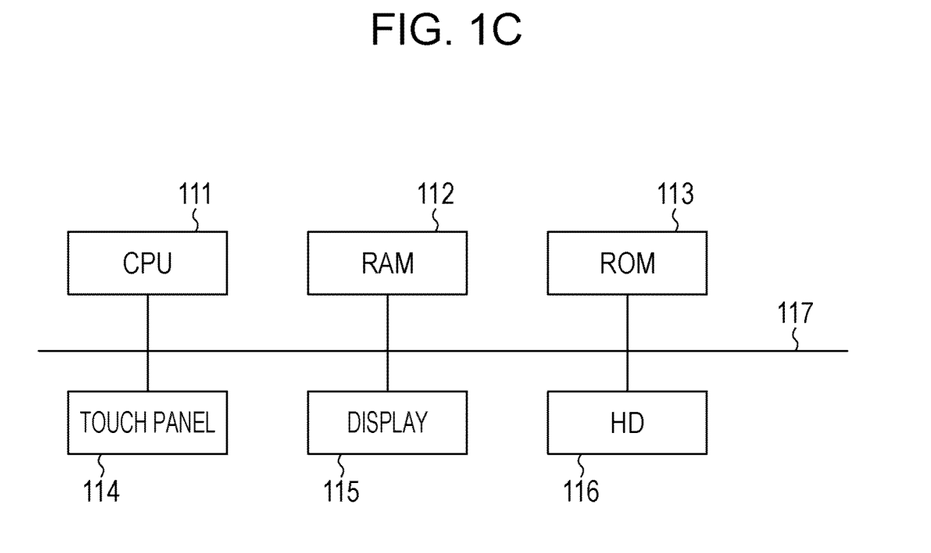

FIG. 1C is a configuration diagram illustrating a hardware configuration of an information processing device that is an example of the present invention.

A CPU 111 controls devices connected thereto through a system bus 117 as a whole. The CPU 111 reads and executes processing steps or a program stored in a read-only memory (ROM) 113 or a hard disk (HD) 116 or from a storage medium such as an external memory. In the same manner, the CPU 111 may execute steps illustrated in the flowcharts in FIGS. 2 and 3 and function as a display control unit 101 and an image generating unit 102. In this case, the random access memory (RAM) 112 may be used as a temporary storage area that is quickly accessible, such as a main memory or a work area, for the CPU 111. The HD 116 stores processing steps in a data file such as a video file, an operating system, an application or the like. A new data file generated by the CPU 111 in accordance with processing steps or a program is stored in a storage device such as an HD 116 or an external memory, not illustrated.

The detecting unit 104 includes a touch panel 114. The display unit 105 includes a display 115. On the touch panel 114, a touch at one position or touches at a plurality of points, a drag (or an operation of touching with a finger and holding and moving the finger), a flick (or an operation of flipping the touching finger quickly) and so on are detected. Further on the touch panel 114 used in this embodiment, a position of a thing (such as a user's finger) approaching the panel is detected whether the thing is touching the panel or not. The approach detection may use a change in capacitance, reflection of ultrasound or a sonic wave or the like. For example, detection using a change in capacitance may measure the capacitance of a circuit formed between a finger tip and a surrounding environment including an electroconductive film, a capacitance measuring device and the ground by using the capacitance measuring device to calculate the distance between the fingertip and the electroconductive film and its position on the panel.

According to this embodiment, the touch panel 114 is tightly mounted on the display 115, and the integrated touch panel display is used as the detecting unit 104 and the display unit 105.

With reference to the attached drawings, a specific operation example of the information processing device will be described below.

By following the flowchart in FIG. 2, edit processing will be described which extracts a part of video file in an information processing device according to the first embodiment.

Figure 4:
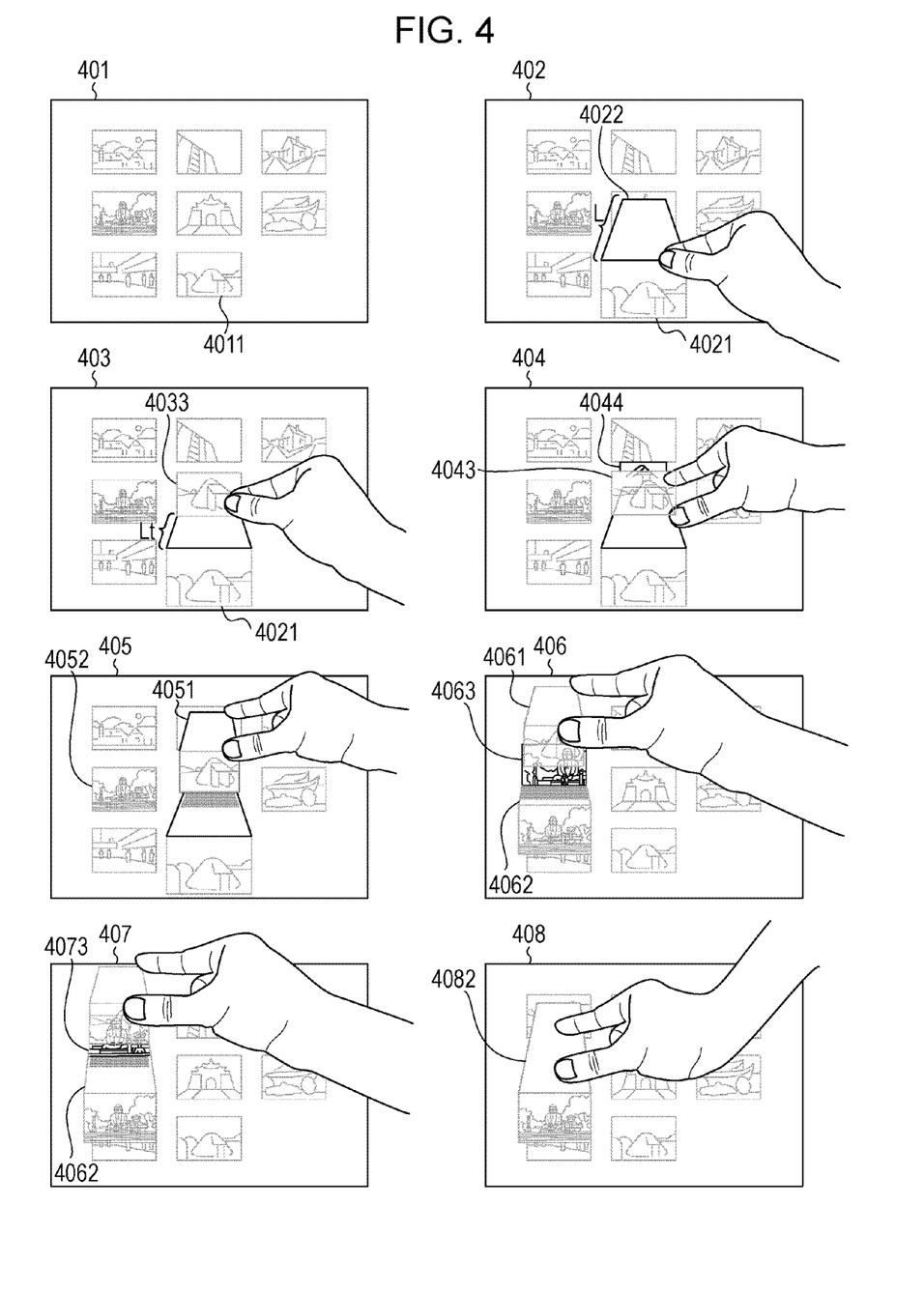
FIG. 4 is a diagram illustrating an example of screen transitions during a video editing work.

In step S201, an initial screen is displayed. On the initial screen, the display control unit 101 reads out a video file from the storage unit 103 and display a thumbnail image on the display unit 105. A screen 401 in FIG. 4 is an example of the initial screen. In this case, eight video files are read out from the storage unit 103, and thumbnail images thereof are displayed. Though thumbnail images of eight video file that are edit candidates are displayed, all of video files are not required to read. In other words, a video file that is an edit candidate may be held in the storage unit 103, and a thumbnail image 4011 as a graphic user interface for edit instruction may be displayed on the screen. Those thumbnail images to be displayed are still images of frames at the starting point of the video files.

Next, in step S202, a thumbnail image of a video file to undergo an editing work is displayed as a three-dimensional object having a depth corresponding to the time axis. For example, when a video file is displayed as a rectangular parallelepiped object, the thumbnail image is displayed on one plane of six planes. The direction of depth viewed from the plane is recognized as the time axis.

According to this embodiment, when a user's finger approaches a thumbnail image 4011 corresponding to a video file, the detecting unit 104 recognizes that the video file has been designated as an edit subject. The thumbnail image 4011 is displayed as a three-dimensional object. When the detecting unit 104 is applying a touch panel which does not perform the approach detection, a three-dimensional object may be displayed in response to a touch to a thumbnail image by a user. The image generating unit 102 generates an image representative of the three-dimensional object, and the display unit 105 shows the image. The screen 402 in FIG. 4 is a screen showing a state where the three-dimensional object 4021 is being displayed in response to detection of a user's touch to the thumbnail image 4011 on the initial screen 401 or an approach of a user's finger.

According to this embodiment, it is assumed for explanation that fingers brought closer to each other as if they are pinching something as illustrated in the screen 402 will touch or approach the screen. The form of fingers as if they are pinching something may be required to open in the subsequent processing. Thus, if one finger touches or approaches there, the next finger movement is an incompatible movement. Therefore, when the detecting unit detects it, the following series of operations is cancelled.

Referring to FIG. 4, the three-dimensional object 4021 is displayed as if it projects toward the near side or vertically or substantially vertically on the screen by perspective projection based on the law of perspective. Because the thumbnail image to be edited is displayed as a solid projecting to the near side, a user may have a visual sense that he or she "may pick and manipulate" the three-dimensional object. According to this embodiment, the depth 4022 of a thumbnail image is recognized as a time axis direction but is displayed as having a predetermined length L independent of the length (the number of frames) of a moving image.

It is assumed that the length L is a length determined by the display control unit 101 on the basis of the size of the display 115 and the number of thumbnail images being displayed. Because the lengths L are equal independent of the time length of the whole video files, the scales in the time axis corresponding to the lengths L of video files having different time lengths are also different. For example, because a video file in one hour and a video file in 30 minutes have the equal depth length L, the scale in the time axis of the files represented by three-dimensional objects is 2:1. As described above, even a three-dimensional object of a video file having a short time length may be edited by a touch operation with fingers in the range of length L.

The representation for generating an image representative of a three-dimensional object by the image generating unit 102 is not limited to perspective projection but may be any representation method which may represent a three-dimensional solid. For example, parallel projection may be used.

Having described above that a thumbnail image is arranged in front of a three-dimensional object with the time axis displayed in the direction of depth, the present invention is not limited thereto. For example, in order to edit in detail frames, the time axis may not be given in the direction of depth where the axis is not allowed to display long. The three-dimensional object may be rotated properly to display the time axis in the vertical or lateral direction of the screen. To do so, an additional command corresponding to a rotate instruction may be input from a user to the detecting unit 104. In order to return a new display state based on the rotate instruction to the original state, an additional command may be input to the detecting unit 104.

In step S203, the display control unit 101 checks whether the detecting unit 104 has detected the designation of a first position to the three-dimensional object 4021 by a user or not. The first position is assumed here as a touch position made first after the thumbnail image 4011 is displayed as the three-dimensional object 4021. It is assumed that the fingers are in contact as if they are pinching something. If the first position is designated, the processing moves to step S204. If not, the processing stays in a standby state until a touch is detected. If a state that does not correspond to the designation of the first position, such as a touch or approach to the screen without fingers in contact as if they are pinching something, is detected, the processing returns to the standby state.

In step S204, the display control unit 101 identifies the time corresponding to the first position detected by the detecting unit 104 in the depth 4022 of the three-dimensional object 4021 and displays the still image (thumbnail image) corresponding to the time. The screen 403 in FIG. 4 shows a state where the first position is designated in the three-dimensional object 4021. The still image 4033 is a thumbnail image of one frame of the video file corresponding to the three-dimensional object 4021. It is assumed that the position in time in a video file corresponding to one frame or the position in a space of the still image 4033 on the screen is the first position designated by a user. The proportion of the length Lt from the starting point to the first position to the length L of the depth 4022 is equal to the proportion of an elapsed time until the frame corresponding to the still image 4033 is reproduced to the time length of the video file corresponding to the three-dimensional object 4021. Here, a user may touch and slide the touch point vertically to sequentially view the previous or subsequent one frame of the one frame that is displayed first.

Next, in step S205, the display control unit 101 checks whether the detecting unit 104 has detected the designation by a user of a second position to the three-dimensional object 4021 or not. The second position here refers to a new touch position that is different from the first position by holding the touch designating the first position. As described above, in order to designate the second position, the finger form is required to change from the "state in which fingers are in contact as if the fingers pinching something" to a "state in which one finger is away from the other finger". In a concrete example, it may be considered that when the position of one finger is the first position, the position of the destination of movement of the other finger away from the first position is the second position. If the second position has been designated, the processing moves to step S208. If not, the processing moves to step S206.

In step S206, whether the first position has changed or not is checked. As described above, a user may touch and slide the touch point vertically to sequentially view the previous or subsequent one frame of the one frame that is displayed first as the still image corresponding to the first position. Thus, a user may change the first position to search a requested frame. If the first position has been changed, the processing moves to step S207. If not, the processing returns to step S205 and stays in a standby state. In step S207, the still image at the time corresponding to the changed first position is newly displayed, and the processing returns to step S205.

In step S208, the display control unit 101 identifies the time corresponding to the second position detected by the detecting unit 104 in the depth 4022 of the three-dimensional object 4021 and displays the still image corresponding to the time. The screen 404 in FIG. 4 shows a state that the second position is given, and the corresponding still image 4044 is displayed. Like the first position, a user may touch and slide the touch point vertically to sequentially view the previous or subsequent one frame of the one frame that is displayed first as the still image corresponding to the second position.

In step S209, whether the first or second position has been changed by a slide operation or not is checked. The first and second positions may be changed by a user to search frames to be the starting point and end point of a video clip to be extracted from the video file corresponding to the three-dimensional object 4021. If the touch position has been changed, the processing moves to step S210. If not, the processing moves to step S211. In step S210, the still image corresponding to the new touch position is displayed, and the processing moves to step S211.

In step S211, whether the first and second positions have been fixed or not is checked. According to this embodiment, the first and second positions are fixed by an operation of releasing the touches for the designation substantially at the same time. In other words, if the detecting unit 104 detects that user's fingers has been taken off the touch panel 114 substantially at the same time, it is then determined that the positions have been fixed. By taking fingers off the touch panel and holding the fingers in a range where an approach is detectable, a user may acquire the sense of feeling as if he or she may "pick" the touched part out of the three-dimensional object with his or her fingers when it is extracted. The operation of fixing the first and second positions is not limited thereto. For example, fingers may keep the interval of their touches and then perform a flick or drag substantial at the same time in a predetermined direction. Alternatively, another finger may be used to tap (an operation of hitting lightly) an arbitrary position of a screen. In this case, even when a touch panel display does not have a sensor which performs the approach detection, the sense of feeling as if a three-dimensional object is "picked" may be expressed. If the first and second positions are fixed, the processing moves to step S212. If not, the processing moves to step S213.

In step S212, the image generating unit 102 generate a thumbnail image of the video corresponding to the part between the first and second positions as a thumbnail image having a depth corresponding to the time axis. Under the control of the display control unit 101, the three-dimensional object corresponding to the extracted video clip is displayed.

A screen 405 in FIG. 4 shows a state that a three-dimensional object 4051 that is a part between the first and second positions is displayed and is moved by an operation as if it is lifted up. In this case, the three-dimensional object 4051 corresponds to a video clip having the first position as a starting point and the second position as an end point. Thus, a still image 4033 is displayed as a thumbnail image, and its depth corresponds to the length from the starting point to the end point, that is, the time length of the video clip corresponding to the part between the first and second positions. After the extracted video clip is displayed as a three-dimensional object, the processing moves to step S214 and awaits an editing work on the extracted video clip.

At that time, according to this embodiment, the extracted video clip contains a copy of a part of the video file corresponding to the original thumbnail image 4011, and any cut, deletion or change has not occurred on the original video file itself. For example, when the first position is a starting point of the three-dimensional object 4021, the second position is its end point, the entire video file is copied. Whether a part of a video file is to be copied or cut may be selectable. Furthermore, in order to cut a part out of the original video filet, the three-dimensional object 4051 is separated from the three-dimensional object of the original file, and the three-dimensional object of the original file is displayed as it is divided into a front part and a rear part.

In step S213, whether an exit operation has been performed or not is checked. The exit operation refers to an operation of stopping extraction of a video clip and finishing the editing work. For example, the exit operation may correspond to an operation of taking fingers that designate the first and second positions off a touch panel sequentially or reducing the interval between the fingers again until they touch each other and separating them. If such a predetermined operation is performed, the information processing device of the present invention exits the processing without extracting the video clip of the part between the first and second positions. If no exit operation has been performed, the processing returns to step S209.

These steps are included in the edit processing of extracting a part from a video file in the information processing device according to the first embodiment. In this case, after the first position is designated, for example (step S204) but the first position is cancelled without designation of the second position, the processing returns to the step (step S203) before the first position is designated. Though such a "cancel operation" exists in each of the steps, it is omitted in the flowcharts for avoiding complexity.

Next, by following the flowchart in FIG. 3, there will be described edit processing of inserting an extracted video clip to a video file according to the first embodiment.

Figure 2:
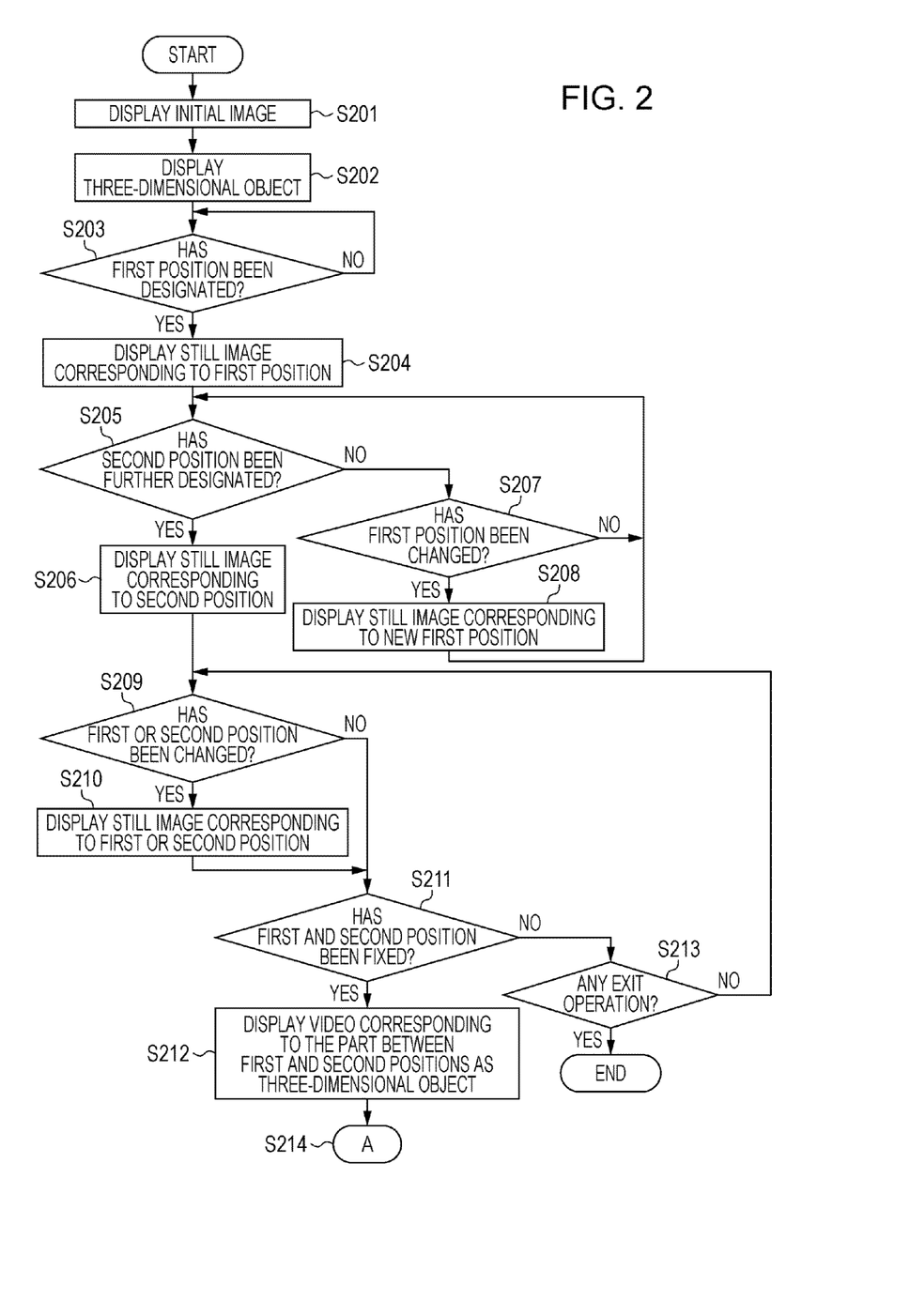
FIG. 2 is a flowchart of edit processing of inserting a video clip to a different video file.

The processing moves from step S214 in the flowchart in FIG. 2 to step S301. In step S301, whether the three-dimensional object that is the extracted video clip has been moved or not is checked. According to this embodiment, step S212 in FIG. 2 displays the three-dimensional object of the part between the first and second position as a result of the substantially simultaneous releases of the touches designating the first and second positions by a user. In this case, the detecting unit 104 detects that the fingers left from the touch panel has moved within the range where a panel approach detection is allowed so that it may be determined that the three-dimensional object has been moved. When the touch panel display does not include a sensor which performs an approach detection, the move operation is allowed by an operation of dragging the first and second fingers "picking" the three-dimensional object. Alternatively, after the fingers are taken off the touch panel once, the extracted three-dimensional object may be designated by one or a plurality of touch operations and be dragged to move it. Next, if the three-dimensional object is moved, the processing moves to step S302. If not, the processing moves to step S314.

In step S302, whether the destination of the movement of the three-dimensional object is on the thumbnail image of the video file or not is checked. The video file here refers to a video file to which a user is going to insert the video clip. In this case, like step S202, the detecting unit 104 in response to the detection of an approach of user's fingers to the thumbnail image displays the thumbnail image of the video file as a three-dimensional object. The image generating unit 102 generates an image representing the thumbnail image of a subject video file as a three-dimensional object having a constant depth and is shown on the display unit 105. The depth corresponds to the time length of the video file. When no approach detection is performed, a fact that the thumbnail image has been touched or a fact that a touch position is approaching as a result of a drag operation may be detected, and the thumbnail image is displayed as the three-dimensional object. If it is moved onto the video file, the processing moves to step S303. If it is not moved onto the thumbnail image of the video file, the processing moves to step S306. In describing the example in FIG. 4, it is assumed that the three-dimensional object 4051 is to be moved onto the thumbnail image 4052 of the screen 405.

Next, in step S303, an image showing a change of the scale of the time axis is displayed when the moved three-dimensional object is inserted to the video file over which the three-dimensional object is placed by the movement. This point will be described details below.

In step S304, it is determined that the video file to which the video clip is to be inserted, and the move three-dimensional object is displayed translucently. In the subsequent step S305, a still image corresponding to a third position is displayed. A screen 406 in FIG. 4 displays the video file of the thumbnail image 4052 as a three-dimensional object 4062. In this case, the three-dimensional object contains an image showing a change in scale of the time axis, as will be described below, when the moved three-dimensional object is inserted. The moved three-dimensional object 4061 is placed over the three-dimensional object 4062 and is thus displayed translucently. Hence, a user is allowed to perform an editing work by watching the three-dimensional object 4062 through the three-dimensional object 4061. A still image 4063 is a still image showing the frame at the time corresponding to a third position by a user with the depth corresponding to the time length of the three-dimensional object 4062.

The third position here designates the position to which the video clip corresponding to the moved three-dimensional object 4061 is to be inserted. According to this embodiment, the detecting unit 104 detects the position where the finger corresponding to the starting point of a video clip (the thumb on the screen 406) among the fingers having moved the three-dimensional object 4061 approaches and identifies it as the third position. If the touch panel 114 that is the detecting unit 104 does not perform an approach detection, the third position may be designated by a touch operation. Like the first and second positions, a user may move a finger designating a position vertically to sequentially view one previous and subsequent frames of the one frame displayed first. According to this embodiment, only one still image 4043 corresponding to the third position is displayed. In this case, it is assumed that the video clip is to be inserted before the frame corresponding to the still image 4043. However, the still image corresponding to the frame before the video clip is inserted may be displayed, or two still images corresponding to the previous and subsequent frames may be displayed.

Next, in step S306, whether the third position has been fixed or not is checked. According to this embodiment, the fix of the third position is determined in accordance with the detection of the fact that a user touches the screen with fingers having approached to the touch panel 114. A user may touch the touch panel again with the fingers having taken off the touch panel 114 and floated to perform an edit operation in the sense of feeling as if he or she may "place the picked three-dimensional object again". The operation for fixing the third position is not limited thereto. For example, when a three-dimensional object is moved by a drag operation on the touch panel 114 that does not perform an approach detection, another finger may be used to tap (an operation of hitting lightly) an arbitrary position of a screen to indicate the fix of the third position. If the third position is fixed, the processing moves to step S307. If not, the processing moves to step S309.

In step S309, whether the third position has been changed or not is checked. As described above, a user may move a finger designating a position vertically to sequentially view one previous and subsequent frames of the one frame displayed first. This allows the user to change the third position for searching the position where the video clip is to be inserted. If the third position is changed, the processing moves to step S308. If not, the processing returns to step S306. In step S308, the still image at the time corresponding to the changed first position is newly displayed, and the processing returns to step S306. A screen 407 in FIG. 4 shows a state that a new still image 4073 is displayed as a result of a change of the third position.

In step S307, a video file of the edited video in which the video clip has been inserted to the fixed third position is generated. According to this embodiment, the file of the edited video is written over the original video file. However, it may be newly saved as a different file. The image generating unit 102 further generates a thumbnail image of the generated video file as a three-dimensional object having the depth corresponding to the time axis of the video file. The display control unit 101 displays the three-dimensional object corresponding to the generated video, and the processing ends. A screen 408 in FIG. 4 shows a state that a three-dimensional object 4082 of the generated video is being displayed.

In step S310, whether the destination of the movement of the three-dimensional object is in an area without the thumbnail image corresponding to the video file or not is checked. If so, the processing moves to step S311. If not, the processing returns to step S302.

In step S311, an image showing a change in scale of the time axis when the moved three-dimensional object is disposed in the area is displayed. This point will be described in detail below.

In the subsequent step S312, whether the arrangement of the three-dimensional object has been fixed or not is checked. If so, the processing moves to step S313. If not, the processing returns to step S302. In this case, the operation of fixing the arrangement is implemented by touching the touch panel 114 with the fingers having moved the three-dimensional object, like the fix of the third position.

In step S313, the video clip corresponding to the moved three-dimensional object is generated as a new video file. The image generating unit 102 generate the thumbnail image of the generated video file as a three-dimensional object having the depth corresponding to the time axis of the video file. The display control unit 101 shows the three-dimensional object corresponding to the generated video file, and the processing ends.

In step S314, whether an exit operation has been performed or not is checked. The exit operation refers to an operation of stopping insertion of a video clip and finishing the editing work. For example, the exit operation may correspond to an operation by a user of moving his/her fingers to the area outside the range allowing the approach detection by the touch panel 114 or reducing the interval between the fingers corresponding to the first and second positions until they touch each other. If such a predetermined operation is performed, the information processing device of the present invention exits the processing without generating a new video file. If no exit operation has been performed, the processing returns to step S301. The same end determination is performed if the exit operation is performed while the processing according to the flowchart is being performed, but it will be omitted for avoiding complexity.

Figure 5:
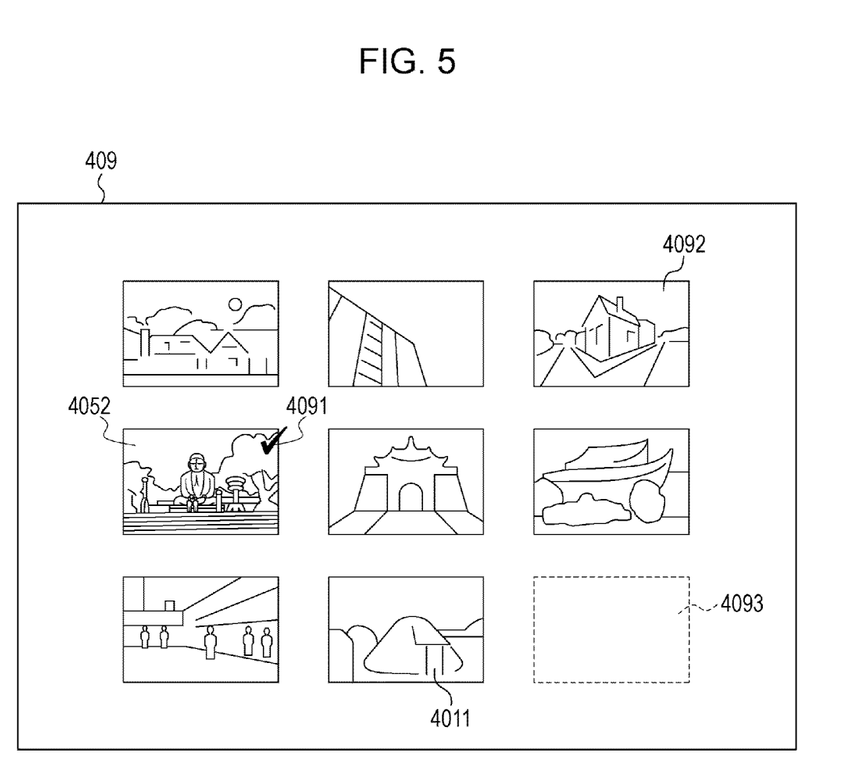
FIG. 5 is a diagram illustrating an example of a screen display after a video editing work.

A screen 409 in FIG. 5 shows transition screens generated as a result of processing including generating a video file in step S307, displaying the three-dimensional object corresponding to the edited video, and then exiting. A checkmark 4091 indicates that the video file has been edited. According to this embodiment, the video file generated by inserting a video clip is written over the original file. Thus, the number of thumbnail images does not change. Therefore, the checkmark 4091 is displayed such that there is a change from the point in time of the initial screen 401. According to this embodiment, because he original video file from which a video clip has been extracted has not been changed, the thumbnail image 4011 does not have the checkmark. However, an indicator that indicates that it has been used for editing may further be displayed. The initial screen when the information processing device is started next may be returned to the screen 401 so that the result of the editing performed at that time may be easily checked upon start. Alternatively, the history of editing may be managed so that the checkmark 4091 may be displayed again after restart and the progress of editing may be checked.

The image showing a change in scale of the time axis displayed in step S303 and step S311 will be described in detail with reference to FIG. 6 and FIG. 7. This image visually shows a result of insertion of a video clip to a different video file for easy perceptual imagining of an editing work. FIG. 6 shows a three-dimensional object relating to editing by parallel projection for more detail explanation on the transition from the screen 405 to the screen 408 in FIG. 4. Here, a thumbnail image not related to editing and user's fingers are omitted here, and like numbers reference to common parts to those in FIG. 4.

Figure 6A:
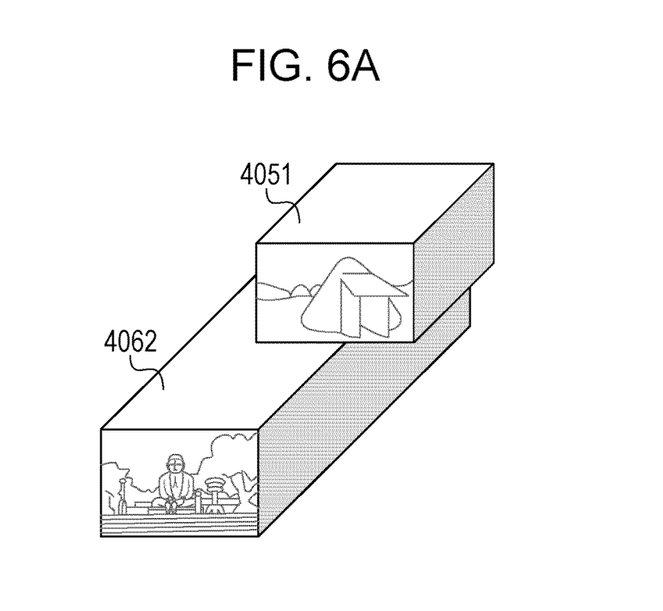
FIG. 6A, FIG. 6B, FIG. 6C, and FIG. 6D are diagrams illustrating how a video clip is inserted to a different video file.

FIG. 6A shows a state that the three-dimensional object 4051 is moved closer to a display area of another thumbnail so that it may be displayed as the other thumbnail image may be displayed as a three-dimensional object 4062 having a depth (step S302). In this case, the length L of the depth of three-dimensional object 4062, as described above, is a constant length independent of the time length of the video file corresponding to the three-dimensional object 4062.

Figure 6B:
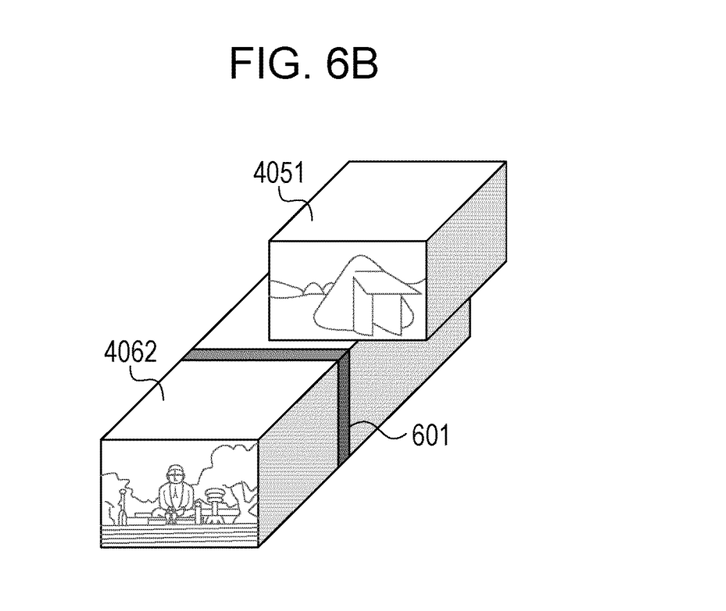
Figure 6C:
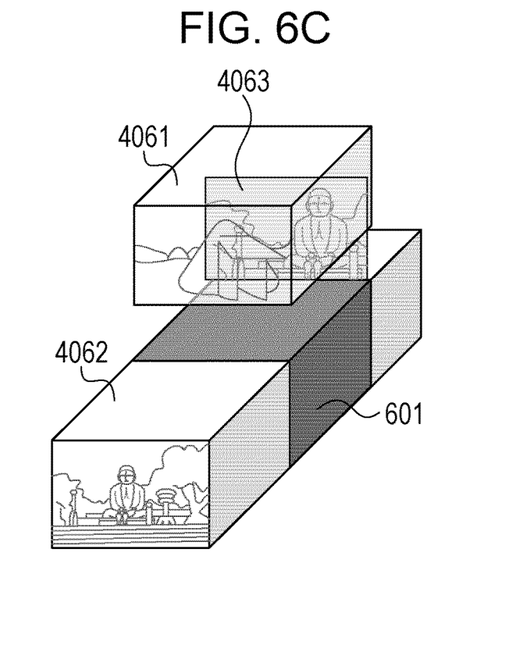

FIG. 6B to FIG. 6C show a process of the change of the display state of the three-dimensional object (video clip) 4051 moved closer to the three-dimensional object 4062 (or a position on the time axis) shown in FIG. 6A. Here, an image 601 which describes a detailed proportion of time lengths of two moving images when the three-dimensional object (video clip) 4051 is inserted to the three-dimensional object (video file) 4062 (step S303).

For example, when the video clip 4051 is a 3-minute video clip and the video file 4062 is a 5-minute video file, 3 min./(3 min.+5 min.)=37.5% of the entire depth of the three-dimensional object 4062 is displayed in a different color as an object 601. In this case, in order to clearly indicate that the object 601 "is the time area when a video clip is inserted" to a user, animation display is preferably. More specifically, it is assumed that the initial depth of the object 601 is shallow as illustrated in FIG. 6B (a state with a little depth). About 40% of the depth of the rear half of the object 601 is displayed in a different color as a result of a gradual increase of the depth, as illustrated in FIG. 6C.

Furthermore, after the transition to the display state in FIG. 6C, the state of the screen 406 in FIG. 4 may be acquired, and the three-dimensional object 4061 is displayed translucently. The still image 6043 corresponding to the third position is displayed (step S305). The object 601 represents a 3-minute video clip inserted to a 5-minute video file, as in the aforementioned example. As already described, according to this embodiment, the still image 4063 corresponds to the frame reproduce next to the video to which a video clip is inserted. In this way, a user may be allowed to perform some work by checking the three-dimensional object 4062 containing the object 601 and still image 4063 through the translucent three-dimensional object 4061 to perceptually imagine the result of editing.

Figure 6D:
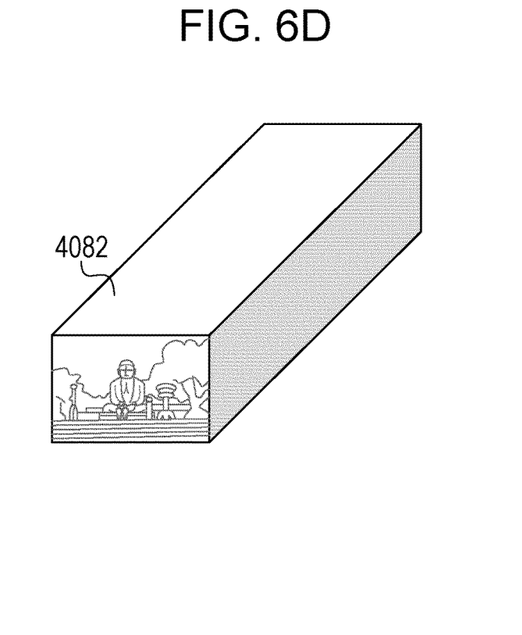

FIG. 6D corresponds to the state of the screen 408 in FIG. 4. In step S307, the generated file of an edited video is displayed as a three-dimensional object 4082.

According to this embodiment, the length L of the depth of the video file displayed as a three-dimensional object is constant. Thus, when an editing work inserts the same video clip, the depth corresponding to the object 601 differs if the time length of the video file to which the video clip is inserted is different. FIG. 7 shows examples for explaining the difference. In FIG. 7, the display of the still image corresponding to the third position will be omitted.

Figure 7A:
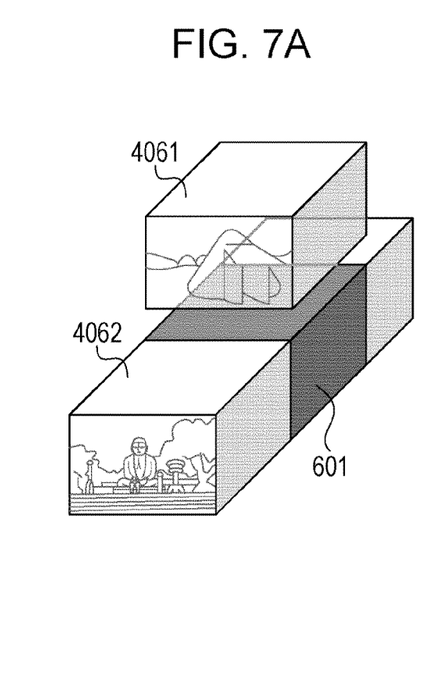
FIG. 7A, FIG. 7B, and FIG. 7C are diagrams illustrating how a video clip is inserted to a different video file.

FIG. 7A shows the same illustration as that of the FIG. 6C and shows a case where a 3-minute video clip is to be inserted to a 5-minute video file. The depth of the object 601 in FIG. 7A is 37.5% of the entire depth L.

Figure 7B:
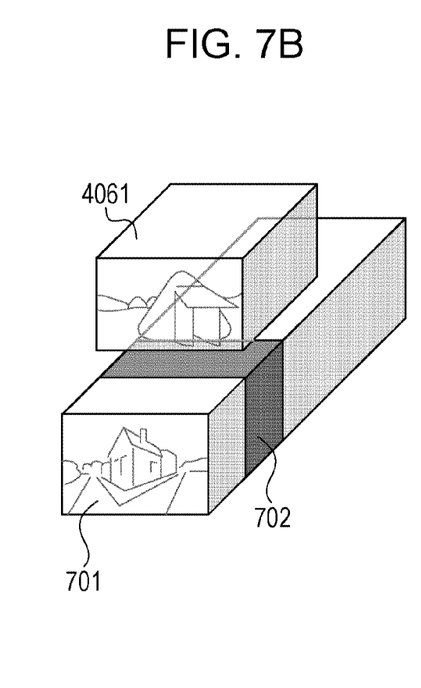

FIG. 7B shows a case where the same three-dimensional object (video clip) 4061 is to be inserted to a three-dimensional object (video file) 701 corresponding to the thumbnail image 4092 on the screen 409 in FIG. 5. Here, it is assumed that the video file corresponding to the three-dimensional object 701 has a time length of 12 minutes. In this case, the depth of the object 702 playing the same role as that of the object 601 is 20% (3 min./(3 min.+12 min.)) of the entire depth L.

Figure 7C:
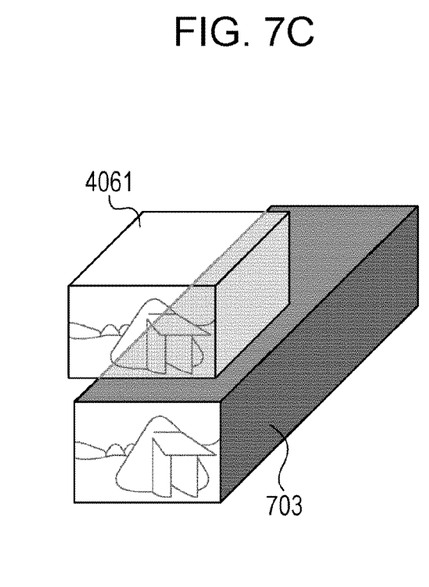

FIG. 7C shows an object 703 to be displayed when a video clip is moved to an area without a thumbnail image (step S311) as in the area 4093 on the screen 409 in FIG. 5. In this case, because a case where an extracted video clip is newly generated as a video file is shown, the depth of the object 703 is equal to the entire depth L. Here, when a video clip is moved to a gap between a thumbnail image and a thumbnail image as the area without a thumbnail image, the thumbnails after the gap are moved back and are displayed again, and the object 703 is displayed in the open space.

As described above, when the same 3-minute video clips are inserted, the size of the object representative of the change in scale of the time axis differs in accordance with the video files to which the video clips are inserted. The three-dimensional object 4061 corresponding to a 3-minute video clip displays the same depth length in FIGS. 7A, 7B, and 7C. This is for preventing complexity of changing the interval of fingers while a user is moving the three-dimensional object 4061. This may provide a user with the sense of feeling as if he or she is "picking and moving" the three-dimensional object 4061. In this way, in response to a movement of the three-dimensional object 4061 by a user, an object having a scale optimized by the image generating unit 102 is generated and is displayed. This allows a user to work on a video file generated as a result of editing by perceptually imagining the timing when a video clip is reproduced or the proportion of the time length.

According to the first embodiment, only the thumbnail image in response to the detection of a touch to a screen by a user or an approach by a user's finger is displayed as a three-dimensional object. However, the present invention is not limited thereto. In a variation example, when an editing work mode is set, all thumbnail images being displayed may be displayed as three-dimensional objects. In this case, the depths of the thumbnail image may not be constant but may relatively vary in accordance with the time lengths. Thus, when a video file has a long time length, the depth length is long. When a video file has a short time length, the depth length is short. The differences of the time lengths of the video files may be visually understood at a glance.

Also in this case, the depth of a thumbnail image in response to the detection of a touch to a screen by a user or an approach by a user's finger may be changed to a predetermined length for display. For example, when a video file having a time length of one hour and a video file having a time length of 3 minutes are both stored in the storage unit 103, the length of the depth of the 3-minute video file is extremely short, making the designation of a touch position difficult. However, a thumbnail image to be edited having a depth changed to a sufficient length allows detail designation of the first and second positions even in a video file having a short time length.

Figure 3:
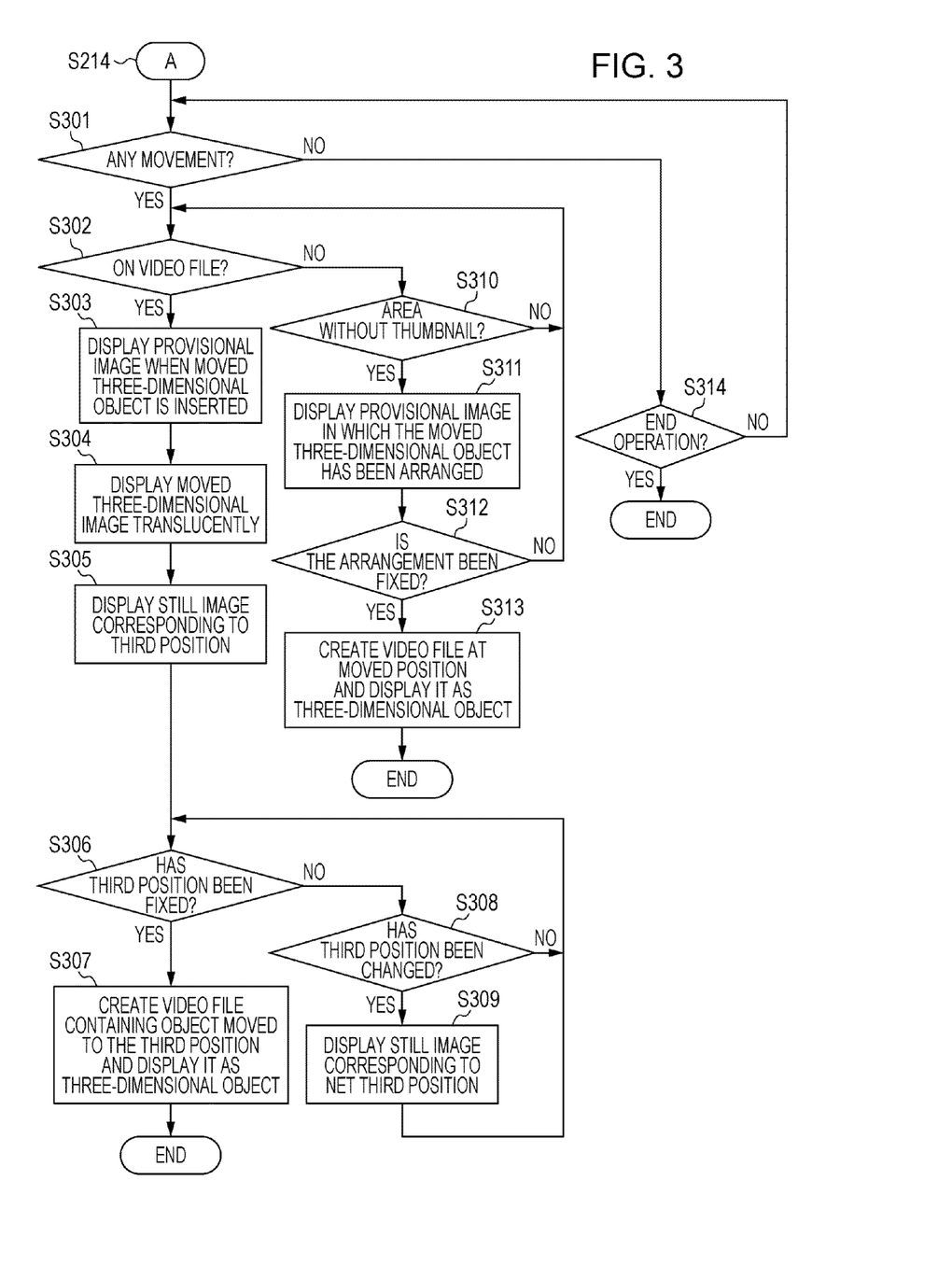
FIG. 3 is a flowchart of edit processing of inserting a video clip to a different video file.

According to the first embodiment, the edit processing on a video clip extracted by following the processing steps in the flowchart in FIG. 2 is not limited to the processing steps in the flowchart in FIG. 3. In a variation example, a part of a video file may be displayed as a three-dimensional object through the "picking" operation. When the part is moved as if it is lifted up, the video clip corresponding to the extracted part may always be generated as a new video file. In this case, the thumbnail image corresponding to the new video file is displayed next to the thumbnail image of the original video file or after all thumbnail images.

This variation example may eliminate the necessity for designating and extracting a starting point and an end point several times or generating and copying a video file by a user when an extracted video clip is repeatedly used for editing.

Alternatively, the "picking" operation on a part of a video file may be performed only when a plurality of video files are displayed, for example. In this case, the picked three-dimensional object may always be inserted to a different video file, and the processing of generating a file of the edited video is performed. In this case, when the newly displayed object is moved to an area without a thumbnail image and undergoes a touch operation, it is determined that there is an exit operation, and the processing ends.

This variation example may avoid increases of the number of video files and provide an editing environment specific to a video containing a plurality of video clips, for example, in an information processing device having a limited capacity of the storage unit 103, such as a digital video camera capable of moving image shooting.

Next, a second embodiment of the present invention will be described. According to the first embodiment, a three-dimensional object represented by the law of perspective on a display is manipulated in response to a detection of a touch and an approach to a touch panel display. According to a second embodiment, a three-dimensional object represented as a 3D image on a 3D display apparatus is manipulated in response to a detection of an operation through a spatial gesture.

FIG. 1B is a block diagram showing specific elements for use when an image generating unit 102 generates a 3D image according to the second embodiment.

As a 3D image, a binocular 3D image has generally been used in practice which displays two images having a disparity to user's right eye and left eye. A 3D display apparatus may include a display panel for each of the right eye and the left eye and display a disparity image. Another display apparatus may display left and right images one over another through a polarized filter or a red blue filter applied to one display apparatus and allow a user to view them through polarized glasses or red-blue glasses. Alternatively, left eye and right eye images may be displayed in time division manner, and a user may view them through shutter glasses which open and closes in synchronism with the images. Another 3D display apparatus may have a Lenticular plate having a directivity to display the images corresponding to the left and right eyes.

Generally, a computer graphics image may be acquired by arranging object form data, a virtual light source, and a virtual camera in a virtual space and rendering a view of an object from a viewpoint of the virtual camera through processes such as projection transformation, hidden surface removal, and shading. A computer graphics binocular 3D image may be acquired by disposing two virtual cameras having substantially same optical axis directions at intervals and handling rendering results from those viewpoints as right eye and left eye images.

Accordingly, the image generating unit 102 first sets the length L of the side in the direction of depth corresponding to the time length of a video file for the basic three-dimensional object form data 106. The first frame of the video file is texture mapped to a surface on the near side of the three-dimensional object to generate the three-dimensional object corresponding to the video file in a virtual space. This is then captured with a virtual cameras arranged at a left view point position coordinates 107 and right view point position coordinates 108 at intervals. The captured images are generated as left eye image 109 and right eye image 110, respectively. The display control unit 101 may use the left eye image 109, and right eye image 110 to display a three-dimensional object represented by a binocular 3D image on the display unit 105 that is a 3D display apparatus.

The spatial gesture detection may be implemented by capturing user's fingers with image pickup means and calculating their positions, for example. The position or a user's gesture in a three-dimensional space may be detected from information on the fingers captured from a plurality of directions with a plurality of image pickup means.

Also according to the second embodiment, a part of a video file is extracted, and edit processing which inserts it to another video file is then performed by following the flowcharts in FIGS. 2 and 3. Because illustrating a state that a 3D image is displayed is difficult, the screen transitions apply correspondingly to FIG. 4.

According to the second embodiment, in S202, a thumbnail image as a result of the detection of the fact that a user's finger has approached by the detecting unit 104 is displayed as a three-dimensional object represented by a binocular 3D image.

In step S203 and step S205, an operation of designating the first and second positions is determined in response to the detection of the position designated by a user in the three-dimensional space by the detecting unit 104. In the same manner, in step S207 or step S209, whether the positions have been changed or not is determined in response to the detection of a movement of a user's finger in the three-dimensional space. In step S211, an operation of fixing the first and second positions is determined in response to the detection by the detecting unit 104 of the fact that a user has moved his or her fingers as if the fingers are picking the part between the first and second positions.

Further in step S301, step S302 and step S310, to whether the newly displayed 3D solid object is being moved is determined by detection of the locus of the movement of the user's fingers holding the three-dimensional object. In the same manner, the detection of the third position in step S305, step S306 or step S308 may be implemented by the detection by the detecting unit 104 of the user's fingers designating or moving in the three-dimensional space. In this case, the user is always making a gesture by watching the three-dimensional object represented by the binocular 3D image shown on the display unit 105.

The operation using a three-dimensional space may provide a user with the sense of operation of "taking a three-dimensional object out, moving it and placing it at a new position".

According to the first and second embodiments, one surface of a three-dimensional object shown on the display unit 105 shows a still image corresponding to the frame that is the starting point of a video file as a thumbnail image. However, the present invention is not limited thereto. For example, a plurality of frames containing the still image may be repeatedly reproduced as a moving image.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-152840, filed Jul. 11, 2011, which is hereby incorporated by reference herein in its entirety.

What is claimed is:

1. An information processing device for editing a moving image, comprising:
a processor; and
memory, the memory storing instructions for:
a display control unit for displaying on a display module a first object three-dimensionally represented by frames contained in a first moving image and a time axis indicative of a playback time of the first moving image, and
detecting, by a detection unit, that a point on the time axis has been designated in response to an instruction by a thing approaching a portion of the display module where the first object is being displayed,
wherein the display control unit, in response to the detection unit detecting that two points have been designated on the time axis, the two points representing a starting point and an end point of a second moving image, the second moving image corresponding to a part of the first moving image, displays a second object that is distinct from the first object, the second object being representative of the second moving image which corresponds to the part of the first moving image between the starting point and the end point in the first moving image, and moves the second object in accordance with a moving operation of the thing,
wherein, from among a plurality of moving images, the display control unit designates a moving image for which an approach of the thing is detected by the detecting unit, a part of the frames of which are displayed as a still image on the display module as the first moving image, and displays the first object three-dimensionally represented by frames contained in the first moving image and a time axis indicative of a playback time of the first moving image,
wherein the detecting unit is a touch panel display which two-dimensionally projects and displays the three-dimensionally represented object and detects a user's touch.

2. The information processing device according to claim 1, wherein when the second object representative of the second moving image of the part between the two points is moved over a third object representative of a third moving image different from the first moving image, the display control unit displays a fourth object representative of an entire fourth moving image into which the second moving image represented by the moved second object is inserted at the time in the third moving image corresponding to one point detected by the detecting unit as having been designated on a time axis representative of a playback time of the third moving image.

3. The information processing device according to claim 2, wherein the display control unit translucently displays the second object which has been moved to the third object representative of the third moving image and displays a fifth object representative of a change in scale of a time axis representative of a playback time of the third moving image when the second moving image represented by the moved second object is inserted at the time corresponding to one point detected by the detecting unit as having been designated on the time axis representative of the playback time of the third moving image.

4. The information processing device according to claim 1, wherein the display control unit displays as a still image the frame of the first moving image at the time corresponding to the point detected by the detecting unit as having been designated on the time axis of the first object three-dimensionally represented by frames contained in the first moving image and a time axis indicative of a playback time of the first moving image.

5. The information processing device according to claim 2, further comprising generation unit for generating as a new file the fourth moving image into which the second moving image represented by the moved second object is inserted.

6. The information processing device according to claim 5, wherein when the second object representative of the second moving image is moved to an area where any object representative of a moving image different from the first moving image is not displayed, the generating unit generates as a new file the second moving image represented by the moved second object.

7. The information processing device according to claim 1, wherein the detecting unit detects a user's gesture in a three-dimensional space.

8. A control method for an information processing device, the method comprising:
displaying on a display module a first object three-dimensionally represented by frames contained in a first moving image and a time axis indicative of a playback time of the first moving image, and
detecting that a point on the time axis has been designated in response to an instruction by an object approaching a portion of the display module where the first object is being displayed,
wherein, in response to detecting that two points have been designated on the time axis, the two points representing a starting point and an end point of a second moving image, the second moving image corresponding to a part of the first moving image, a second object is displayed, the second object being distinct from the first object, the second object being representative of the second moving image which corresponds to the part of the first moving image between the starting point and the end point in the first moving image, and the second object is moved in accordance with a moving operation of the object, wherein, from among a plurality of moving images, the display control unit designates a moving image for which an approach of the thing is detected by the detecting unit, a part of the frames of which are displayed as a still image on the display module as the first moving image, and displays the first object three-dimensionally represented by frames contained in the first moving image and a time axis indicative of a playback time of the first moving image, wherein the detecting unit is a touch panel display which two-dimensionally projects and displays the three-dimensionally represented object and detects a user's touch.

9. A non-transitory computer-readable storage medium which stores instructions that when executed cause a processor to perform processes relating to editing a moving image, such processes comprising:

displaying on a display module a first object three-dimensionally represented by frames contained in a first moving image and a time axis indicative of a playback time of the first moving image; and detecting that a point on the time axis has been designated in response to an instruction by an object approaching a portion of the display module where the first object is being displayed, wherein, in response to detecting that two points have been designated on the time axis, the two points representing a starting point and an end point of a second moving image, the second moving image corresponding to a part of the first moving image, a second object is displayed, the second object being distinct from the first object, the second object being representative of the second moving image which corresponds to the part of the first moving image between the starting point and the end point in the first moving image, and the second object is moved in accordance with a moving operation of the object, wherein, from among a plurality of moving images, the display control unit designates a moving image for which an approach of the thing is detected by the detecting unit, a part of the frames of which are displayed as a still image on the display module as the first moving image, and displays the first object three-dimensionally represented by frames contained in the first moving image and a time axis indicative of a playback time of the first moving image, wherein the detecting unit is a touch panel display which two-dimensionally projects and displays the three-dimensionally represented object and detects a user's touch.

* * * * *